United States Patent
Takeda et al.

(10) Patent No.: US 6,571,653 B1
(45) Date of Patent: Jun. 3, 2003

(54) BALL SCREW

(75) Inventors: Ryuji Takeda, Tokyo (JP); Tetsuhiro Nishide, Tokyo (JP); Hiroshi Niwa, Tokyo (JP); Mitsuaki Honma, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/806,693

(22) PCT Filed: Nov. 8, 1999

(86) PCT No.: PCT/JP99/06214

§ 371 (c)(1), (2), (4) Date: Jun. 6, 2001

(87) PCT Pub. No.: WO01/35002

PCT Pub. Date: May 17, 2001

(51) Int. Cl.[7] ............................ F16H 25/24; F16C 29/00
(52) U.S. Cl. ......................... 74/89.4; 74/89.44; 277/354
(58) Field of Search .................. 74/89.4, 89.44, 74/467; 277/354, 911

(56) References Cited

U.S. PATENT DOCUMENTS

| | | | | |
|---|---|---|---|---|
| 2,757,548 A | * | 8/1956 | Smith | 74/89.44 |
| 2,793,538 A | * | 5/1957 | Sears | 74/89.4 |
| 4,052,076 A | * | 10/1977 | Wysong | 277/354 |
| 4,407,511 A | * | 10/1983 | Benton et al. | 277/354 |
| 4,905,533 A | | 3/1990 | Benton et al. | |
| 5,029,877 A | * | 7/1991 | Fedeli | 277/354 |
| 6,276,225 B1 | * | 8/2001 | Takeda et al. | 277/354 |

FOREIGN PATENT DOCUMENTS

| | | |
|---|---|---|
| JP | 6-6795 | 1/1994 |
| JP | 10-30704 | 2/1998 |
| JP | 11-166608 | 6/1999 |

* cited by examiner

*Primary Examiner*—William C Joyce
(74) *Attorney, Agent, or Firm*—Armstrong, Westerman & Hattori, LLP.

(57) ABSTRACT

Lubricant retaining slits (5) are formed on a pair of seal members (2) from end surfaces (2b) thereof facing inside in the axial direction of a nut (1) of a ball screw to intermediate portions of the seal members (2), and foreign bodies removing slits (6) are formed on the seal members (2) from end surfaces (2c) thereof facing outside in the axial direction of the nut (1) to intermediate portions thereof The lubricant retaining slits (5) can positively trap the lubricant invading into the gap between the seal member (2) and the screw shaft and returns the lubricant inside the nut (1). The foreign bodies removing slits (6) can remove the foreign bodies stored on the outer peripheral surface of the screw shaft and discharged outside the nut (1).

5 Claims, 6 Drawing Sheets

BALL SCREW

TECHNICAL FIELD OF THE INVENTION

The present invention relates to a ball screw provided with seal members at both end portions of a nut.

1. Background Art

As a seal member of a conventional ball screw, there is known seal members mounted at both end portions of a nut (refer to Japanese Utility Model Laid-open Publication No. HEI 6-6795). Each of such seal members has a ring shape and has an inner peripheral surface at which a projection, fitted into a ball rolling groove of a screw shaft, is formed. A slit is formed on the seal member so as to extend from an end surface of the nut facing outside in the axial direction of the nut to an intermediate portion of the seal member. By mounting the seal members at both end portions of the nut, the seal members tightly contact the outer peripheral surfaces of the screw shaft to thereby seal a lubricant inside the nut. Furthermore, by forming the slit on the seal member, an edge portion of the slit contacting the outer peripheral surface of the screw shaft scrapes off foreign bodies adhering to the screw shaft and discharges the foreign bodies outside the nut, thus preventing the foreign bodies from invading inside the nut.

However, in the conventional seal structure mentioned above, the lubricant inside the nut easily invades into a gap between the screw shaft and the seal members and there is a fear that the lubricant leaks outside the nut. Moreover, the lubricant will be also scraped off as well as the foreign bodies by the edge portion of the slit, and for this reason, the scraped lubricant is discharged outside the nut and never return to the inside of the nut. As mentioned above, if the lubricant leaks outside the nut, another device for maintenance may be required for additionally supplying a lubricant to the nut, and moreover, evaporation of the lubricant in a vacuum atmosphere may constitutes another problem.

2. Disclosure of the Invention

The present invention was conceived to solve the problems mentioned above and an object thereof is to provide a ball screw having a seal member capable of effectively maintaining a lubricant inside a nut and preventing foreign bodies from invading inside the nut.

Hereunder, the present invention will be described. Further, it is to be noted that although reference numerals used on the accompanying drawings are added with ( ) for the sake of easy understanding of the present invention, the present invention is not limited only to the shown embodiment.

The above object can be achieved, according to the present invention, by providing a ball screw comprising a screw shaft formed, on an outer peripheral surface thereof, with a ball rolling groove, a number of balls rolling along the ball rolling groove, a nut (1) screwed with the screw shaft through the balls and seal members (2) disposed at both end portions of the nut, each of the seal members (2) being formed, on an inner peripheral surface thereof, with a projection (2a) in shape of spiral to be fitted to the ball rolling groove, wherein a lubricant retaining portion (5) is formed on the seal member (2) from an end surface (2b) thereof facing inside in the axial direction of the nut (1) to an intermediate portion thereof.

According to this invention, since the lubricant retaining portion (5) is formed on the seal member (2) from an end surface (2b) thereof facing inside in the axial direction of the nut (1) to an intermediate portion thereof, the lubricant invading into the gap between the seal member (2) and the screw shaft through the end surface (2b) can be positively trapped and returned to the inside portion of the nut (1). Therefore, the lubricant inside the nut (1) can be prevented from leaking out of the nut (1).

Furthermore, the present invention is characterized by forming a foreign bodies removing portion (6) to the seal member (2) from an end surface (2c) thereof facing outside in the axial direction of the nut (1) to an intermediate portion thereof.

According to this invention, since the foreign bodies removing portion (6) is formed on the seal member (2) from the end surface (2c) thereof facing outside in the axial direction of the nut (1) to the intermediate portion thereof, the foreign bodies storing on the outer peripheral surface of the screw shaft (including a surface of the ball rolling groove) can be removed and discharged out of the nut (1).

Furthermore, in the present invention, the lubricant retaining portion (5) is characterized by a slit.

According to this invention, the lubricant is scraped off by the edge portion of a side surface (8b) of the slit on contact with the screw shaft and returned inside the nut (1).

Furthermore, in the present invention, the foreign bodies removing portion (6) is characterized by a slit.

According to this invention, the foreign bodies is scraped off by the edge portion of a side surface (10b) of the slit and discharged out of the nut (1).

Still furthermore, in the present invention, pressing means (12a, 12b) for pressing the seal members (2) against the screw shaft are provided.

According to this invention, since the pressing means (12a, 12b) for pressing the seal members (2) against the screw shaft are provided, the lubricant retaining portion (5) or foreign bodies removing portion (6) can be tightly on contact with the screw shaft. Therefore, the lubricant can be surely trapped or foreign bodies can be removed.

BEST MODE FOR EMBODYING THE INVENTION

Figure 1:
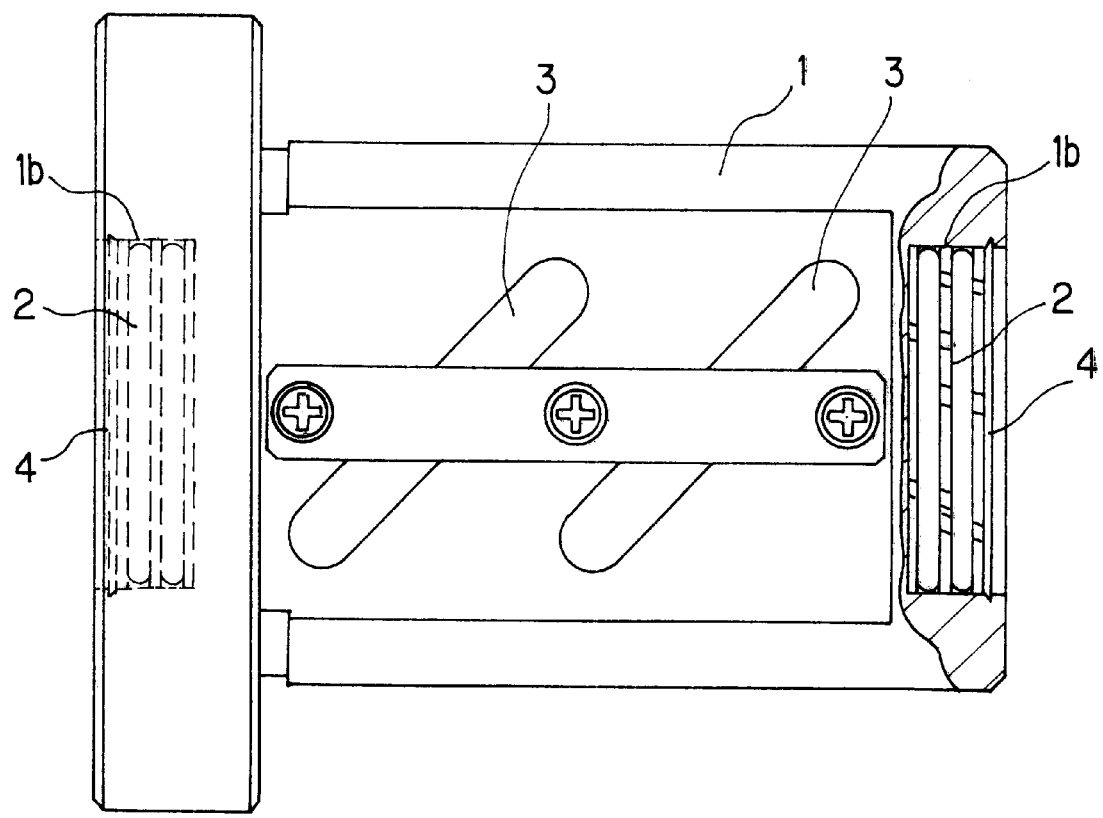
FIG. 1 shows a plan view of a nut and seal members of a ball screw according to one embodiment of the present invention.
Figure 2:
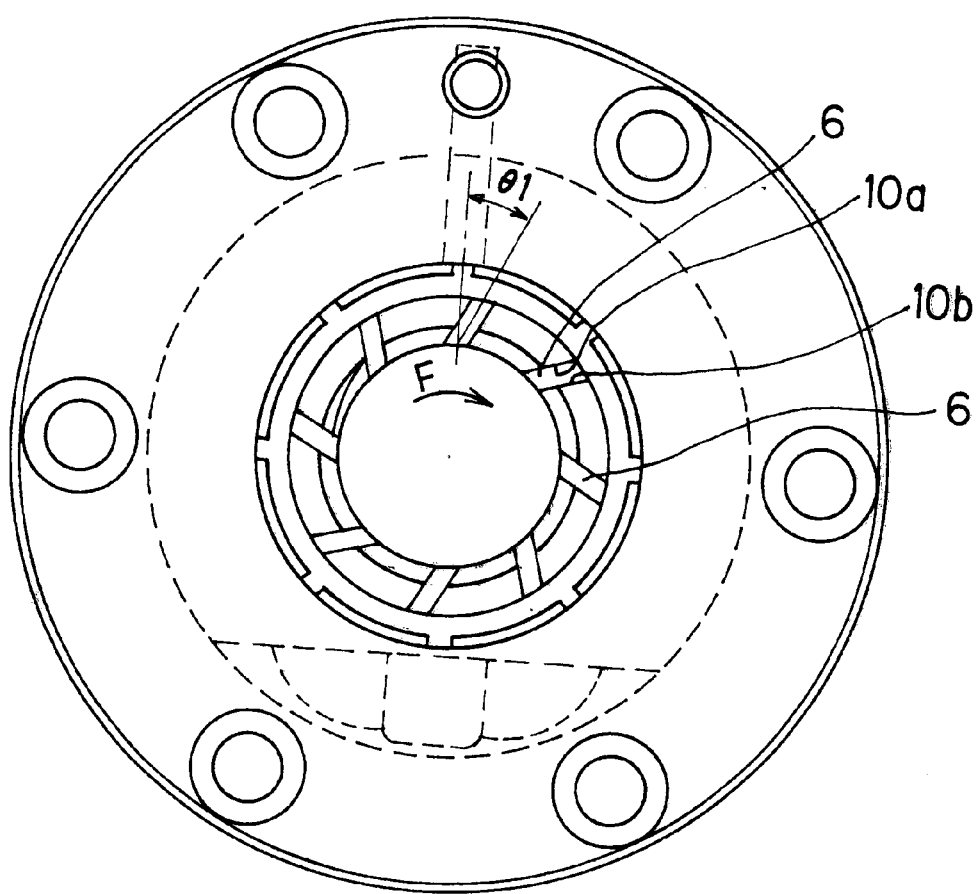
FIG. 2 shows a side view of FIG. 1.
Figure 3:
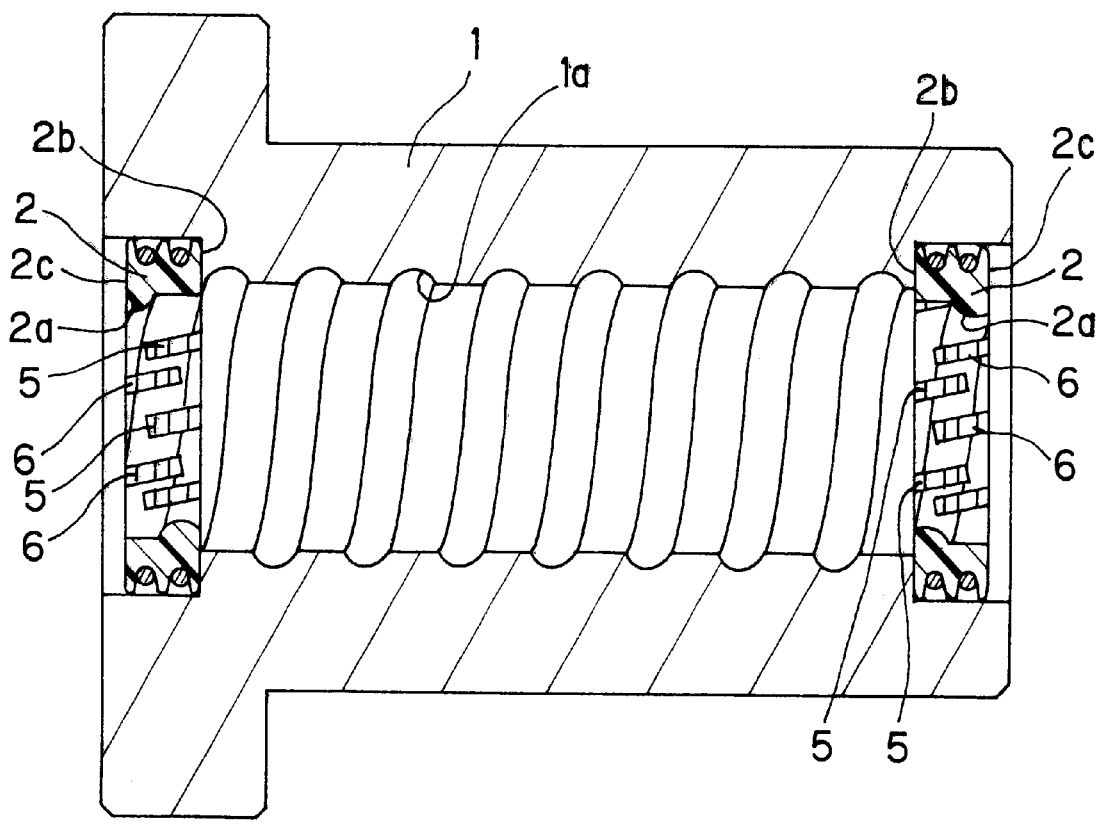
FIG. 3 shows a sectional view of FIG. 1.

FIGS. 1 to 3 represent a ball screw, according to one embodiment of the present invention, having a ball screw nut 1 and seal members 2. As is known, the ball screw comprises a screw shaft (not shown) having an outer peripheral surface on which a spiral ball rolling groove is formed, a nut 1 having an inner peripheral surface to which a spiral ball rolling groove 1a opposing to the ball rolling groove formed on the screw shaft is formed, and a number of balls (not shown) arranged and accommodated between the ball rolling groove 1a of the nut 1 and the ball rolling groove of the screw shaft. When the screw shaft is rotated, the balls roll in the space between the ball rolling groove 1a of the nut 1 and the ball rolling groove of the screw shaft. A ball reaches one end portion of the ball rolling groove 1a of the nut 1 and returns to an opposite side of the ball rolling groove 1a through a return tube 3 fixed to the nut 1. The nut 1 carries out a linear motion along the screw shaft by the rotation thereof.

A pair of seal member mounting bores 1b are formed at both axial end portions of the nut 1. A ring-shaped seal member 2 is mounted to each of the seal member mounting bores 1b and fastened by means of snap ring 4 so as not to be come off therefrom. The seal member 2 is produced through an injection molding of a synthetic resin or through a cutting working, and a spiral projection 2a is formed on the inner peripheral surface of the seal member 2 so as to be fitted into the ball rolling groove of the screw shaft (see FIG. 3).

As shown in FIG. 3, a plurality of slits 5, 5 - - - , 5 for retaining the lubricant are formed on the seal member 2 so as to each extend from an end surface 2b of the axially inside portion of the nut 1 towards an intermediate portion of the seal member 2, and also, a plurality of slits 6, 6, - - - , 6 for removing foreign bodies are formed on the seal member 2 so as to each extend from an end face 2c of the axially outside portion of the nut towards an intermediate portion of the seal member 2. The lubricant retaining slits 5 can prevent the lubricant (grease, for example) filling the inner portion of the nut 1 from leaking outward and the foreign bodies removing slits 6 can prevent the foreign bodies from invading inside the nut 1.

Figure 4:
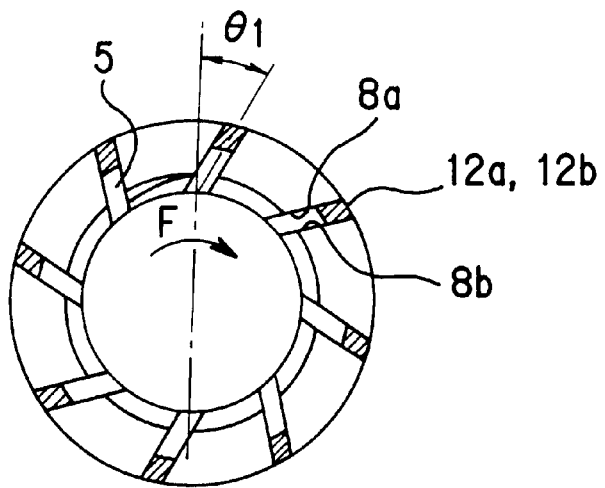
FIG. 4 shows a front view of a seal member.

FIG. 4 shows an arrangement of the lubricant retaining slits 5, 5, - - - , 5. The lubricant retaining slits 5 extend substantially in a radial direction of the screw shaft so as to penetrate the seal member 2 as holes from its inner periphery to its outer periphery. Further, in FIG. 4, oblique line portions represent springs 12a and 12b described hereinlater. In this embodiment, these lubricant retaining slits 5 are formed on eight portions of the seal member 2 with equal distance between adjacent ones in the circumferential direction. The eight lubricant retaining slits 5 are formed so as to each have an inclination θ 1 in the rotating direction F of the screw shaft and be gradually displaced in an arrow direction F from the inner periphery of the screw shaft towards the outer periphery thereof. As mentioned above, according to the inclined formation of the lubricant retaining slits 5, one of opposing side surfaces 8a and 8b of the slit 5 acts as a lubricant retaining scraper surface 8b having an edge portion for scraping off the lubricant. The number of the lubricant retaining slits 5 may be optionally selected.

Figure 5:
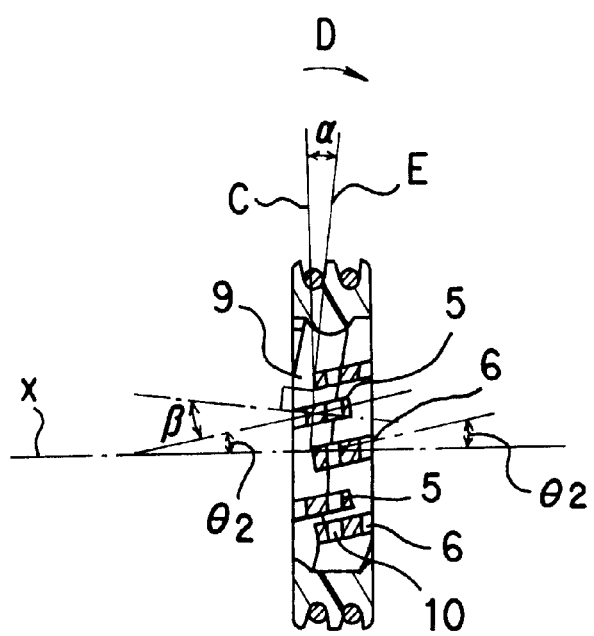
FIG. 5 shows a sectional view of the seal member.

FIG. 5 shows a sectional view of the seal member 2. The lubricant retaining slits 5 are formed so as to each have an inclination θ 2 with respect to a direction of an axis X of the nut 1. That is, in a case where the center line E of the ball rolling groove 9 inclines, at a lead angle of α, in a predetermined deflected direction D with respect to the direction (direction of auxiliary line C) normal to the direction of the axis X of the nut 1, the center line of the lubricant retaining slit 5 inclines at the predetermined angle θ 2 in a direction reverse to the direction D with respect to the axis X of the nut 1. The lubricant retaining scraper surface 8b is inclined at an angle of β from a surface normal to the center line E of the ball rolling groove 9 so as to displace the scraped lubricant in the axis X direction of the nut and return the lubricant inside the nut 1. The eight lubricant retaining slits 5 are all formed at the inclination θ 2 with respect to the axis X of the nut 1.

The foreign bodies removing slits 6 extend substantially in a radial direction of the screw shaft so as to penetrate the seal member 2 as holes from its inner periphery to its outer periphery (see FIG. 2). In this embodiment, these foreign bodies removing slits 6 are also formed on eight portions of the seal member 2 with equal distance between adjacent ones in the circumferential direction so as to each have an inclination θ 1 in the rotating direction F of the screw shaft with respect to the radial direction of the screw shaft. One of opposing surfaces 10a and 10b of the slit 6 acts as a foreign bodies removing surface 10b having an edge portion for scraping off the foreign bodies.

As shown in FIG. 5, the foreign bodies removing slits 6 are formed so as to each have an inclination θ 2 with respect to the direction of the axis X of the nut 1. That is, in a case where the center line E of the ball rolling groove 9 inclines, at a lead angle of α, in a predetermined deflected direction D with respect to the direction (direction of auxiliary line C) normal to the direction of the axis X of the nut 1, the center line of the foreign bodies removing slit 6 inclines at the predetermined angle θ 2 in the direction reverse to the direction D with respect to the axis X of the nut 1. As mentioned above, according to the inclined formation of the foreign bodies removing slits 6, the foreign bodies removing scraper surface 10b is inclined at an angle of β, from the surface normal to the center line E of the ball rolling groove 9 so as to displace the scraped foreign bodies in the axis X direction of the nut and discharge it outside the nut 1.

Figure 6:
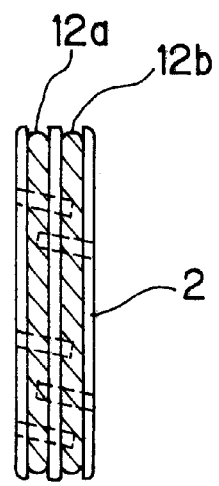
FIG. 6 shows a side view of a ring to which a spring is mounted.
Figure 7:
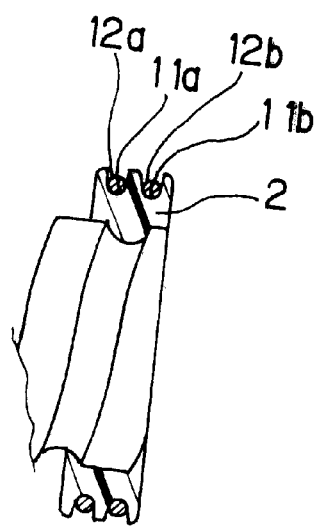
FIG. 7 shows a sectional view showing a screw shaft and the seal member.

With reference to FIGS. 6 and 7, the seal members 2 are each formed with two grooves 11a and 11b to the outer peripheral surfaces so as to extend in the circumferential direction thereof, and springs 12a and 12b are wound up around the grooves 11a and 11b, respectively. As mentioned, by winding the springs 12a and 12b around the outer peripheries of the seal members 2, an elastic property is imparted to the seal members 2 and the flexible elastic seal members 2 can be tightly fitted to the screw shaft to thereby improve the sealing performance. In addition, the edge portions of the lubricant retaining scraping surface 8b and the foreign bodies removing scraping surface 10b can be surely contacted to the screw shaft to thereby surely scrape off the lubricant and the foreign bodies. The number of the grooves 11a and 11b extending in the circumferential direction of the seal members 2 is not limited to two and may be optionally selected, for example, even one groove.

Next, hereunder, the lubricant scraping function and the foreign bodies removing function of the seal members 2 will be described in the case where the screw shaft is rotated in the direction F in FIGS. 2 and 4.

When the ball screw is rotated in the direction F in FIG. 2 or 4, the edge portion of the scraper surface 8b of the lubricant retaining slit 5 of the seal member 2 slides in contact with the outer peripheral surface of the screw shaft. For this reason, the lubricant adhering to the outer peripheral surface of the screw shaft can be scraped off by the edge portion of the scraper surface 8b of the lubricant retaining slit 5 and scraped on the scraping surface 8b thereof. Since this scraping surface 8b of the lubricant retaining slit is inclined at an angle of β with respect to the direction normal to the center line E of the ball rolling groove 9, the lubricant is returned to the inside of the nut 1. Accordingly, the lubricant invading from the end surface 2b of the seal member 2 into the gap between the nut 1 and the screw shaft can be positively trapped and returned again to the inside of the nut 1. Further, in the case where the ball screw is rotated in the direction reverse to the direction F in FIG. 2 or 4, the lubricant can be sealed at the end surface 2b of the seal member 2 as in the case of no formation of a lubricant removing slit (see FIG. 3).

On the other hand, when the screw shaft is rotated in the direction F in FIG. 2 or 4, the edge portion of the scraper surface 10b of the foreign bodies removing slit 6 slides on the outer peripheral surface of the screw shaft in contact therewith. Accordingly, the foreign bodies adhering to the outer peripheral surface of the screw shaft can be scraped off and the scraped foreign bodies is then scraped on the scraper surface 10b for removing the foreign bodies. Further, since this scraper surface 10b also has an inclination β to a direction normal to the center line E of the ball rolling groove 9, the scraped foreign bodies is discharged out of the seal member 2.

Figure 8:
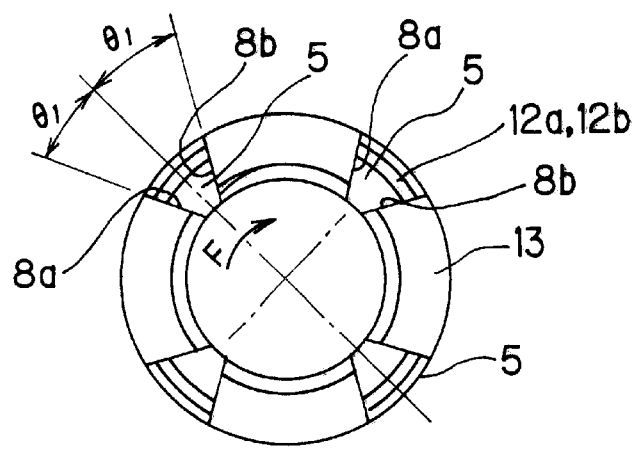
FIG. 8 shows a front view showing another example of a seal member.
Figure 9:
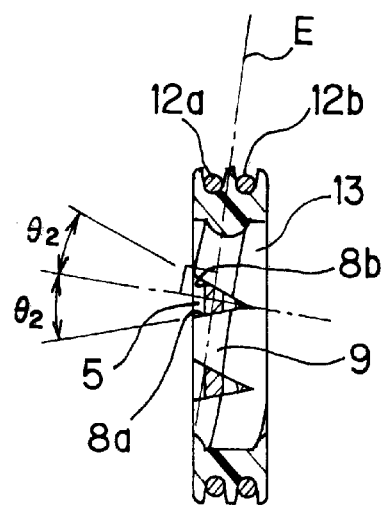
FIG. 9 shows a sectional view of FIG. 8.

FIGS. 8 and 9 represent another example of a seal member 13, to which only the slits 5, 5 - - -, 5 for retaining the lubricant are formed as shown. Such seal member 13 will be applicable to ball screw used at a vacuum environment, for example, in which the generation of the foreign bodies will be prevented and the leaking of the lubricant will be prohibited. As shown in FIG. 8, one 8b of opposing side surfaces 8a and 8b of the lubricant retaining slit 5 is inclined at an angle of θ 1 in the rotational direction F with respect to the radial direction of the nut and this angle is displaced gradually from the inner periphery of the seal member 13 towards the outer periphery thereof. On the other hand, the other surface 8a of the slit 5 is inclined at an angle of θ 1 in the direction reverse to the rotational direction F of the surface 8b with respect to the radial direction. As mentioned above, by inclining both the opposing side surfaces 8a and 8b of each of the lubricant retaining slits 5, 5 - - -, 5, the lubricant can be scraped even if the screw shaft is rotated in any direction.

Furthermore, as shown in FIG. 9, one 8a of opposing side surfaces 8a and 8b of the lubricant retaining slit 5 may be inclined at an angle of θ 2 from a direction normal to the center line E of the ball rolling groove 9 and the other one 8b may be inclined at an angle of θ 2 in a direction reverse to the direction normal to the center line E of the ball rolling groove 9. As mentioned above, by inclining both the opposing surfaces 8a and 8b, even if the screw shaft is rotated in any direction, the lubricant scraped off by the edge portion of the opposing surfaces 8a and 8b can be moved in the axial direction of the screw shaft and returned inside the nut 1.

Further, in the above disclosure, although only the lubricant retaining slits 5 are mentioned, the foreign bodies removing slits 6 may be formed in substantially the same manner as that mentioned above, so that the foreign bodies can be scraped off and removed outside even if the screw shaft is rotated in any direction.

As mentioned hereinabove, according to the present invention, each of the lubricant retaining portions is formed on the seal member from an end surface of the seal member facing inside in the axial direction of the nut to the intermediate portion thereof, and each of the foreign bodies removing portions is formed on the seal member from an end surface of the seal member facing outside in the axial direction of the nut to the intermediate portion thereof, so that the lubricant invading into the gap between the seal member and the screw shaft through the end surface of the seal member can be positively trapped and returned to the inside of the nut, and the foreign bodies remaining on the outer peripheral surface of the screw shaft can be removed and discharged outside. Therefore, the lubricant can be retained in the inside portion of the nut and the foreign bodies can be prevented from entering inside the nut.

What is claimed is:

1. A ball screw comprising a screw shaft formed, on an outer peripheral surface thereof, with a ball rolling groove, a number of balls rolling along said ball rolling groove, a nut screwed with said screw shaft through the balls and seal members disposed at both end portions of the nut, each of said seal members being formed, on an inner peripheral surface thereof, with a spiral projection to be fitted into said ball rolling groove, wherein a lubricant retaining portion, being a slit, is formed on the seal member from an end surface thereof facing inside in the axial direction of the nut to an intermediate portion thereof and said lubricant retaining portion scrapes a lubricant invading into a gap between said seal member and said screw shaft and returns the lubricant to an inner portion of the nut, and wherein a foreign bodies removing portion, being a slit, is formed on the seal member from an end surface thereof facing outside in the axial direction of the nut to an intermediate portion thereof and said foreign bodies removing portion scrapes foreign bodies adhering to an outer peripheral surface of the screw shaft and discharges the foreign bodies outside the nut.

2. A ball screw according to claim 1, wherein a pressing means for pressing said seal member against the screw shaft is provided.

3. A ball screw according to claim 1, wherein said slit of the lubricant retaining portion penetrates the seal member from an inner peripheral portion to an outer peripheral portion thereof.

4. A ball screw according to claim 1, wherein said slit of the foreign bodies removing portion penetrates the seal member from an inner peripheral portion to an outer peripheral portion thereof.

5. A ball screw according to claim 1, wherein a lubricant retaining scraper surface having an edge portion for scraping off the lubricant is formed at one of opposing side surfaces of the slit of the lubricant retaining portion, and the lubricant retaining scraper surface is formed to have an inclination θ 1 in a rotating direction of the screw shaft and have an inclination θ 2 with respect to a direction of an axis of the nut so as to displace the scraped lubricant in the axial direction of the nut and return the lubricant inside the nut.

* * * * *